United States Patent [19]
Jachimowicz et al.

[11] Patent Number: 5,644,369
[45] Date of Patent: Jul. 1, 1997

[54] SWITCHABLE LENS/DIFFUSER

[75] Inventors: Karen E. Jachimowicz, Laveen; Michael S. Lebby, Apache Junction, both of Ariz.

[73] Assignee: Motorola, Schaumburg, Ill.

[21] Appl. No.: 393,639

[22] Filed: Feb. 24, 1995

[51] Int. Cl.$^6$ .......................... G02F 1/1335; G02B 5/32
[52] U.S. Cl. .................. 349/10; 349/112; 359/15; 359/599
[58] Field of Search ..................... 359/40, 69, 51, 359/52, 95, 15; 349/112, 183, 10, 599, 15

[56] References Cited

U.S. PATENT DOCUMENTS

| | | | |
|---|---|---|---|
| 5,198,912 | 3/1993 | Ingwall et al. | 359/52 |
| 5,245,449 | 9/1993 | Ooi et al. | 359/51 |
| 5,299,289 | 3/1994 | Omae et al. | 359/95 |
| 5,353,133 | 10/1994 | Bernkopf | 359/51 |
| 5,359,441 | 10/1994 | Mori et al. | 359/51 |
| 5,473,448 | 12/1995 | Yoshinaga et al. | 359/52 |
| 5,477,351 | 12/1995 | Takahara et al. | 359/51 |
| 5,528,402 | 6/1996 | Parker | 359/95 |

FOREIGN PATENT DOCUMENTS

| | | | |
|---|---|---|---|
| 62-86330 | 4/1987 | Japan | 359/69 |
| 63-318519 | 12/1988 | Japan | 359/40 |
| 6-265891 | 9/1994 | Japan | 359/40 |

*Primary Examiner*—William L. Sikes
*Assistant Examiner*—Tiep H. Nguyen
*Attorney, Agent, or Firm*—Eugene A. Parsons

[57] ABSTRACT

A switchable lens/diffuser including an optical component constructed to form an optical image in cooperation with light directed thereon and a layer of polymer dispersed liquid crystal material having a clear state and a diffusing state, the layer of material being positioned in conjunction with the optical component so that the optical component forms an optical image when the layer of polymer dispersed liquid crystal material is in the clear state and the layer of polymer dispersed liquid crystal material serves as a diffusing screen to form an image in cooperation with the light directed thereon in the diffusing state.

7 Claims, 4 Drawing Sheets

SWITCHABLE LENS/DIFFUSER

FIELD OF THE INVENTION

The present invention pertains to optical lens systems and more specifically to optical lens systems in image manifestation apparatus.

BACKGROUND OF THE INVENTION

In the prior art, optical elements or components are used to operate on light rays passing therethrough to magnify images, focus images, collimate light, reflect light and a variety of other applications.

Light diffusers are elements that light does not pass through, but which diffuse the light or redirect light rays in many different directions. Light diffusers are used as screens for many electronic devices, such as television and computer displays because an image directed onto a diffuser appears as a direct view image.

In some visual systems, such as that disclosed by Song et al. in a copending patent application entitled "Receiver With Miniature Virtual Image Display", filed Apr. 22, 1994, Ser. No. 08/231,570, and assigned to the same assignee, two different displays are incorporated in a single electronic device, one using optical components to produce a virtual image and one using a diffuser to produce a direct image. One problem with this device is that the two displays are physically separated and an operator must look at different areas of the electronic device to view the different images. Also, each of the different images requires a different image generator. In many applications this is inconvenient and it also uses additional real estate of the electronic device.

It would be highly desirable to produce a single, switchable lens/diffuser device that could be utilized to produce either an ordinary optical component function or a diffuser function.

Accordingly, it is a purpose of the present invention to provide a switchable lens/diffuser device which can be electrically switched between an optical component state and a diffuser state.

It is another purpose of the present invention to provide a switchable lens/diffuser device which is relatively simple to fabricate and operate.

It is still another purpose of the present invention to provide a switchable lens/diffuser device which can be relatively easily incorporated into electronic devices as dual image manifestation apparatus.

It is yet another purpose of the present invention to provide a switchable lens/diffuser device which can be fabricated to incorporate virtually any optical component.

SUMMARY OF THE INVENTION

The above problems and others are at least partially solved and the above purposes and others are realized in a switchable lens/diffuser including an optical component constructed to form an optical image in cooperation with light directed thereon and a layer of polymer dispersed liquid crystal material having a clear state and a diffusing state, the layer of material being positioned in conjunction with the optical component so that the optical component forms an optical image when the layer of polymer dispersed liquid crystal material is in the clear state and the layer of polymer dispersed liquid crystal material serves as a diffusing screen to form an image in cooperation with the light directed thereon in the diffusing state.

BRIEF DESCRIPTION OF THE DRAWINGS

Referring to the drawings.

DESCRIPTION OF THE PREFERRED EMBODIMENTS

Figure 1:
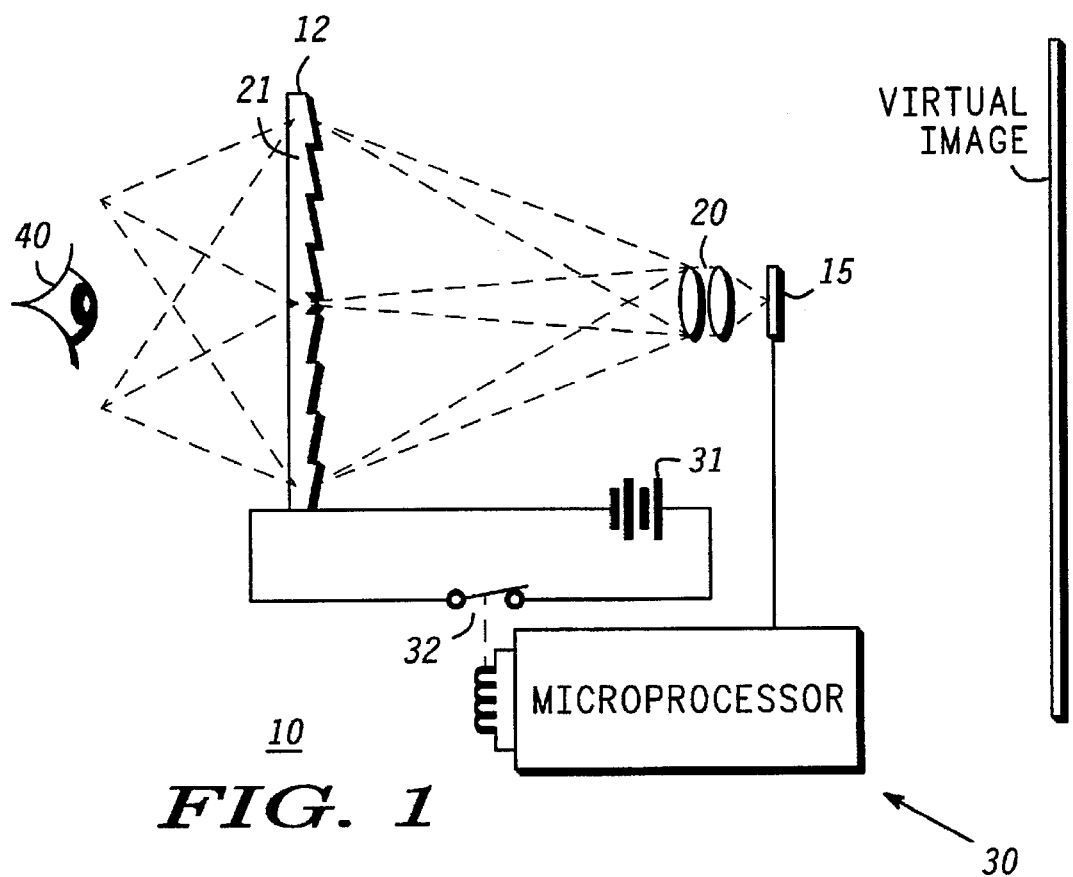
FIG. 1 is a simplified schematic view of image manifestation apparatus including a switchable lens/diffuser in a first mode of operation.

Referring specifically to FIG. 1, a simplified schematic view of image manifestation apparatus 10, including a switchable lens/diffuser 12, in a first mode of operation is illustrated. Image manifestation apparatus 10 further includes an image source, or image generator 15 and a projection lens system 20 which magnifies and projects images from image generator 15 onto switchable lens/diffuser 12. Specific mounting details are not included to simplify the drawings and explanation.

Image generator 15 includes a two dimensional array of light emitting elements including any of inorganic light emitting diodes, organic light emitting diodes, field emission devices, semiconductor vertical cavity lasers, light conducting devices, etc. Generally, the two dimensional array is large enough to contain sufficient pixels, or light emitting elements, to portray a complete frame (e.g. pictures, maps, photographs and/or multiple lines of text) on the surface of the two dimensional array without requiring vibrating mirrors or the like. The electronic elements are generally arranged in rows and columns, and each row and each column may contain, for example, as many as 500 to 2000 electronic devices. In some instances one light emitting element will define a pixel, in some instances additional elements will be included for extra power and redundancy and in some instances two or more elements are used in each pixel to provide color. Also, in most applications the size of image generator 15 will be on the order of a few millimeters (e.g. 2–9 mm) on a side. For example, when image generator 15 is formed of an array of semiconductor devices it is formed on a single semiconductor chip.

Figure 2:
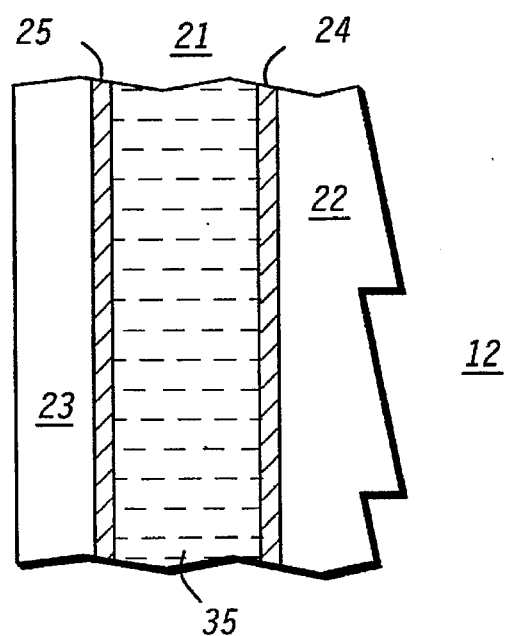
FIG. 2 is a greatly enlarged sectional view illustrating a small cross-sectional portion of FIG. 1.

Switchable lens/diffuser 12, in this specific embodiment, is a Fresnel lens which operates optically with projection lens system 20 to produce a large (e.g. 8.5'×11') virtual image from the small image generated at image generator 15. The large virtual image appears to the viewer to be behind image manifestation apparatus 10, generally as illustrated in FIG. 1. Switchable lens/diffuser 12 is constructed with a central cavity 21 that is co-extensive with the working portion of the Fresnel lens, i.e. all but the outer edges of switchable lens/diffuser 12 which are utilized for mounting purposes. A greatly enlarged sectional view of switchable lens/diffuser 12 is illustrated in FIG. 2, illustrating cavity 21 in detail. As can be seen more clearly in FIG. 2, a front portion 22 and a rear portion 23 cooperate to define therebetween cavity 21. It should be noted that front portion 22 and rear portion 23 are constructed with sufficient optical material (e.g. glass, optical plastic, etc.) to provide a desired lens function.

Front portion 22 also has a thin, optically clear, conductive layer 24 of material on the inner surface thereof and rear portion 23 has a similar thin, optically clear, conductive layer 25 of material on the inner surface thereof. Layers 24 and 25 are electrically separated from each other and have an electrical potential source 31, represented by a battery, connected thereto through a circuit 30 including a switch 32. When switch 32 is closed, electrical potential source 31 is connected directly to layers 24 and 25, which create an electrical field therebetween across cavity 21. Layers 24 and 25 are formed of any convenient optically transparent material, such as indium-tin-oxide, very thin metals, certain conductive polymers, or the like.

Cavity 21 is filled with a polymer dispersed liquid crystal (PDLC) material 35. Material 35 includes a plurality of liquid crystals which, when properly energized, align themselves to transmit light therethrough and when de-energized realign themselves randomly to produce a diffuse or translucent effect. Thus, material 35 and, consequently, switchable lens/diffuser 12, has two modes of operation: a first mode in which material 35 is transparent and switchable lens/diffuser 12 operates as an ordinary Fresnel lens and a second mode in which material 35 is translucent and switchable lens/diffuser 12 operates as a diffuser. It should be understood that many variations of the energization scheme are possible including: applying a potential across material 35 to make it transparent; applying a different potential across material 35 to make it translucent; etc. In FIG. 1, material 35 is energized to the first mode and an observer at a point 40 a short distance from switchable lens/diffuser 12 sees a relatively large virtual image.

Figure 3:
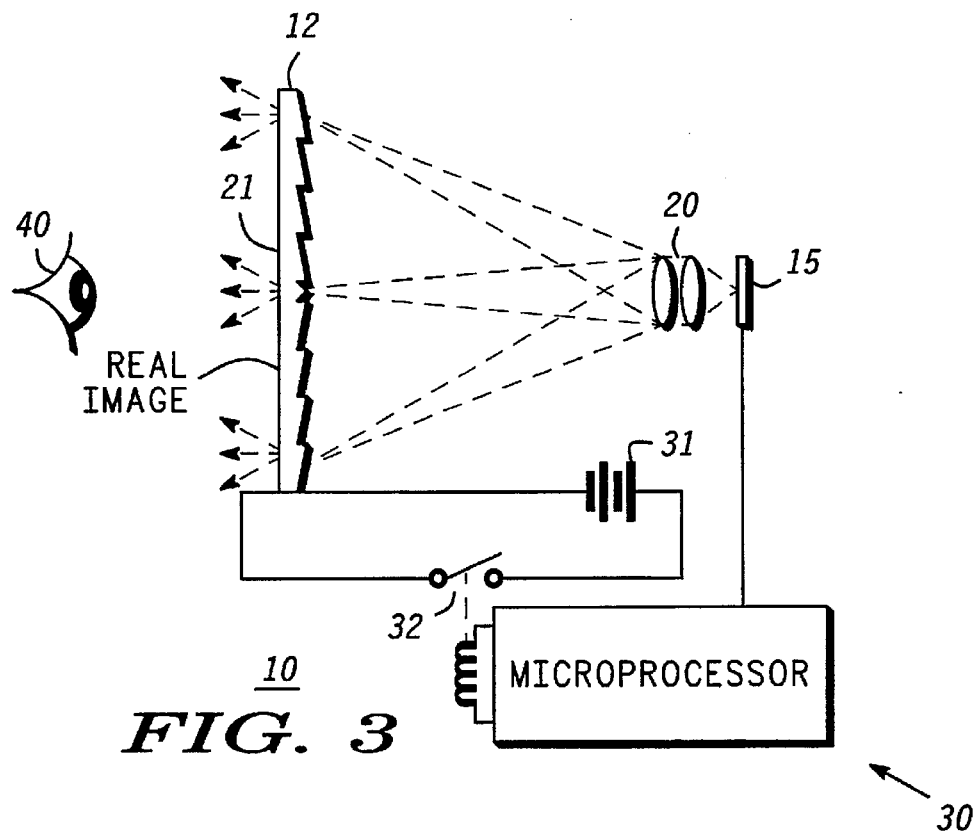
FIG. 3 is a view similar to FIG. 1 of the manifestation apparatus in a second mode of operation.

Referring specifically to FIG. 3, the second mode of operation for switchable lens/diffuser 12 is illustrated. In this mode, switch 32 is opened to remove the electrical field from across material 35 so that material 35 is randomly oriented and, consequently, translucent or diffuse. In this mode of operation an observer at point 40 a short distance from switchable lens/diffuser 12 sees a smaller direct view image on the surface of switchable lens/diffuser 12 which can be no larger than the size (surface area of the outer side) of switchable lens/diffuser 12.

In electronic devices, such as cellular telephones, pagers, data storage devices, etc., image manifestation apparatus 10 in the first mode (FIG. 1) is used to display large amounts of information, such as pictures, maps, photographs and/or multiple lines of text. Also, the virtual image is generally viewed through an aperture and has a dark background with no invading ambient light so that it is substantially unaffected by background or ambient light. Thus, image manifestation apparatus 10 in the first mode of operation can be effectively used in high ambient light environments. In such electronic devices, image manifestation apparatus 10 in the second mode (FIG. 3) is used to display smaller amounts of information, such as telephone numbers, one or two line canned messages, etc. or in low ambient light and/or large eye relief applications.

Figure 4:
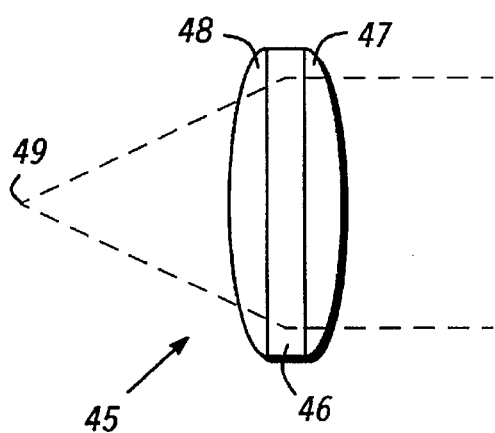
FIGS. 4 and 5 are views of another type of switchable lens/diffuser in first and second modes of operation, respectively.
Figure 5:
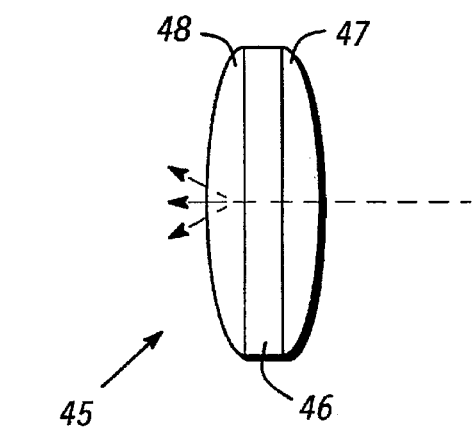

Referring specifically to FIGS. 4 and 5, an embodiment of a switchable lens/diffuser 45 is illustrated. Switchable lens/ diffuser 45, in this specific example, is a double convex lens with a central cavity 46 filled with PDLC material. As an example of a method of fabricating switchable lens/diffuser 45, central cavity 46 can be formed as a thin disc or wafer shaped container with a layer of optically clear, electrically conductive material on each major surface thereof. A pair of plano-convex lenses 47 and 48 are then affixed to opposite major surfaces of central cavity 46 to complete the structure.

As previously described, when the PDLC material is activated the liquid crystals align themselves to transmit light therethrough and when de-energized realign themselves randomly to produce a diffuse or translucent effect. As illustrated in FIG. 4, the PDLC material is activated to make it transparent and switchable lens/diffuser 45 acts like a standard double convex lens. In this example, collimated light entering the lens is focused to a point 49. As illustrated in FIG. 5, the PDLC material is de-activated to make it diffuse or translucent and switchable lens/diffuser 45 acts like a diffuser. Light entering switchable lens/diffuser 45 is diffused, rather than being focused.

Figure 6:
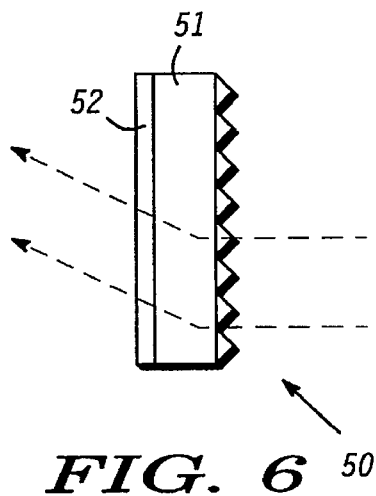
FIGS. 6 and 7 are views of still another type of switchable lens/diffuser in first and second modes of operation, respectively.
Figure 7:
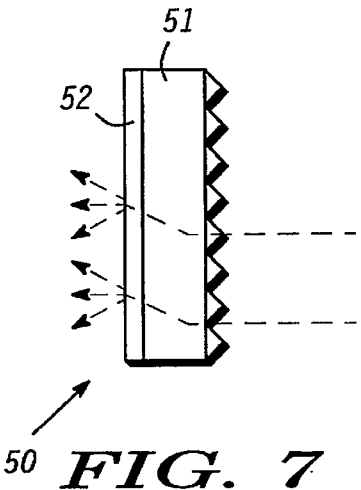
Figure 8:
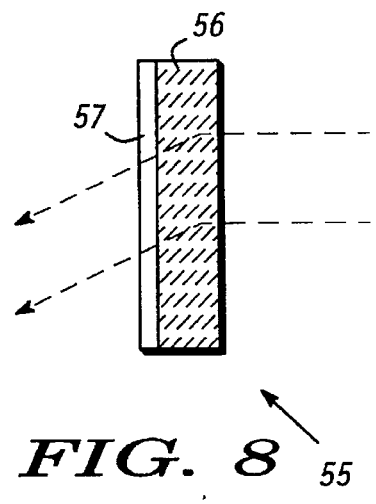
FIGS. 8 and 9 are views of yet another type of switchable lens/diffuser in first and second modes of operation, respectively.
Figure 9:
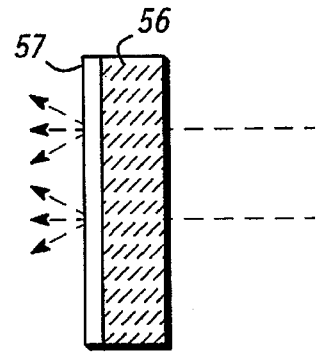
Figure 10:
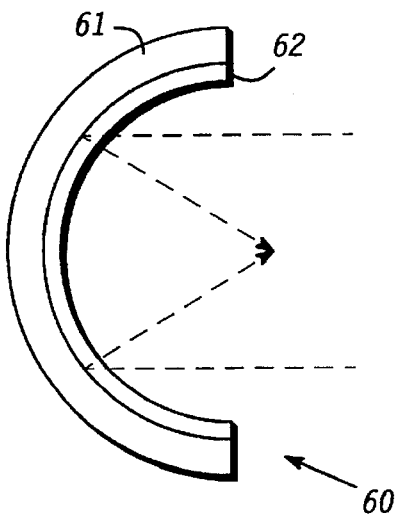
FIGS. 10 and 11 are views of another type of switchable lens/diffuser in first and second modes of operation.
Figure 11:
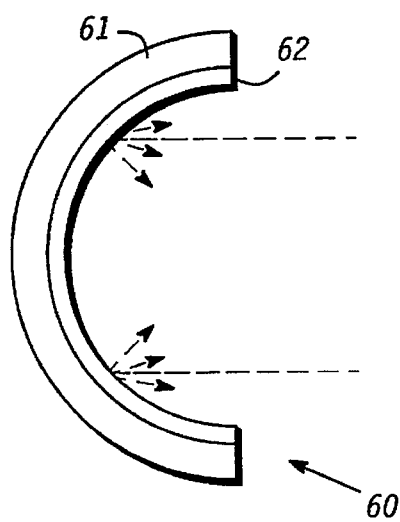

In a similar fashion, FIGS. 6 and 7 illustrate two modes of an embodiment of a switchable lens/diffuser 50 including a diffractive optical element (DOE) 51 and a cavity or container 52 of PDLC material. Similarly, FIGS. 8 and 9 illustrate two modes of an embodiment of a switchable lens/diffuser 55 including a volume hologram element 56 and a cavity or container 57 of PDLC material. Also, FIGS. 10 and 11 illustrate two modes of an embodiment of a switchable lens/diffuser 60 including a shaped mirror 61 and a cavity or container 62 of PDLC material. Many other variations and modifications will become apparent to those skilled in the art upon reading this disclosure.

Figure 12:
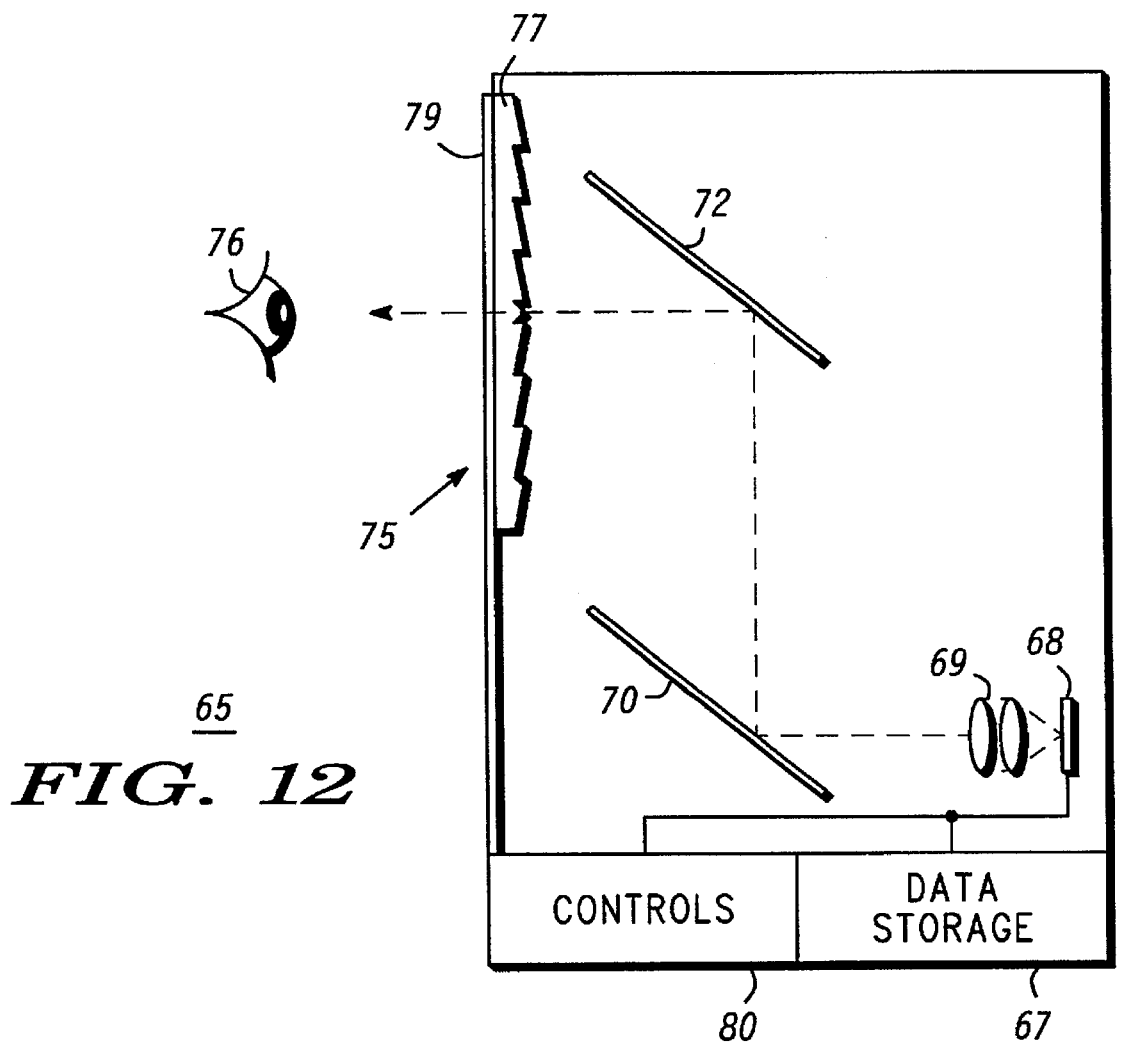
FIG. 12 is a simplified schematic view of an electronic device including image manifestation apparatus with a switchable lens/diffuser.

Referring specifically to FIG. 12, an electronic device 65 such as a pager, portable telephone, cellular telephone, portable data base, etc. is illustrated. Device 65 contains the usual data source, including storage and/or data receiving circuitry and equipment, generally designated 67. An image generator 68 is positioned in the housing of device 65 and connected to data source 67 so as to utilize data from data source 67 to generate an image on the surface thereof. As explained above, image generator 68 includes a large plurality of rows and columns of light emitting devices which are addressed in some selected order to generate an image with the emitted light.

The light emitted by image generator 68 is projected by a projection lens system 69 onto a first surface 70, which directs the light onto a second surface 72. Second surface 72 directs the light outwardly through a switchable lens/diffuser 75 where it can be viewed by an operator at a point 76. Surfaces 70 and 72 can be incorporated into a waveguide virtual image display similar to that disclosed in U.S. Pat. No. 5,224,198, entitled Waveguide Virtual Image Display and issued Jun. 29, 1993, which is incorporated herein by reference, along with the various embodiments of waveguide displays disclosed therein. In this specific embodiment, switchable lens/diffuser 75 includes a Fresnel lens portion 77 and a substantially co-extensive cavity or container 79 filled with PDLC material and having a conductive layer (not shown) on each side thereof. The conductive layers are electrically connected to a control portion of device 65, generally designated 80.

As one simplified example of a possible operation of device 65, controls 80 include a direct/virtual switch for switching between a direct image and a virtual image. In the standard mode of operation, device 65 provides a direct image for the operator on switchable lens/diffuser 75. In this mode cavity or container 79 of PDLC is not activated and thus presents a diffuse surface. Generally, in this mode image generator 68 may also be switched so that a group of light emitting devices operate in parallel to form each pixel of the image. Thus, there are fewer pixels and the image is much simpler, generally a few alpha-numeric characters (e.g. a telephone number) or a simple canned message, etc. Although the image is simpler it is also much brighter so that it can be seen in the ambient light conditions prevailing in most offices, homes, etc.

If the operator receives an indication that a larger or more complex message is being sent, or if the operator wishes to view a more complicated image from data storage 67, the operator simply switches the direct/virtual switch to the virtual image position and an electric field is applied across cavity or container 79 of PDLC material so that the material becomes transparent. Simultaneously, light emitting devices in image generator 68 are switched out of the group mode so that an image of a full page of information can be generated. In this mode the brightness of the image is diminished but, since the image is being viewed as a virtual image there is no background or ambient light to detract on interfere with the virtual image.

Thus, a single, switchable lens/diffuser device that can be utilized to produce either an ordinary optical component function or a diffuser function is disclosed which can be easily electrically switched between an optical component state and a diffuser state. Further, the switchable lens/diffuser device is relatively simple to fabricate and operate and can be relatively easily incorporated into electronic devices as dual image manifestation apparatus. While several specific embodiments are illustrated as examples, the switchable lens/diffuser device can be fabricated to incorporate most optical components.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A switchable lens/diffuser comprising:

a refractive lens constructed to form an optical image in cooperation with light directed thereon; and a layer of polymer dispersed liquid crystal material having a clear state and a diffusing state, the layer of material being positioned in a cavity in the refractive lens so that the refractive lens forms an optical image when the layer of polymer dispersed liquid crystal material is in the clear state and the layer of polymer dispersed liquid crystal material serves as a diffusing screen to form an image in cooperation with the light directed thereon in the diffusing state; and means including a pair of optically clear electrically conductive layers one on each opposite side of the layer of polymer dispersed liquid crystal material for providing an electrical potential thereacross, the means being associated with the layer of polymer dispersed liquid crystal material for switching the layer of polymer dispersed liquid crystal material between the clear state and the diffusing state.

2. Image manifestation apparatus for selectably providing a direct image or a virtual image, the apparatus comprising:

image generation apparatus for generating a two dimensional image;

a projection lens system positioned adjacent the image generation apparatus for projecting generated images to a remote plane; and a switchable lens/diffuser mounted in the remote plane and including an optical component constructed to form a virtual image in cooperation with the generated image projected thereon, the optical component being selected from the group including an optical lens, a Fresnel lens, a diffraction lens, a holographic lens, a diffractive optical element, and a volume hologram, a layer of polymer dispersed liquid crystal material having a clear state and a diffusing state, the layer of material being positioned in conjunction with the optical component so that the optical component forms a virtual image when the layer of polymer dispersed liquid crystal material is in the clear state and the layer of polymer dispersed liquid crystal material in cooperation with the generated image projected thereon serves as a diffusing screen to form a direct image in the diffusing state, and first and second electrical means disposed on opposite sides of the layer of polymer dispersed liquid crystal material, respectively, for providing an electrical potential across the layer of polymer dispersed liquid crystal material to switch the layer of polymer dispersed liquid crystal material between the clear state and the diffusing state.

3. Apparatus as claimed in claim 2 wherein the first and second electrical means each includes a layer of optically clear electrically conductive indium-tin-oxide.

4. Apparatus as claimed in claim 2 wherein the layer of polymer dispersed liquid crystal material is positioned in a cavity in the optical component.

5. Apparatus as claimed in claim 2 wherein the image generation apparatus includes a two dimensional array of light emitting elements selected from a group including inorganic light emitting diodes, organic light emitting diodes, field emission devices, semiconductor vertical cavity lasers, and light conducting devices.

6. Apparatus as claimed in claim 2 wherein the image generation apparatus includes switching means for switching between a low data content image mode for low ambient light, large eye relief applications and a high data content image mode for high ambient light applications.

7. Apparatus as claimed in claim 6 wherein the image generation apparatus is connected to operate with the switchable lens/diffuser so that the image generation apparatus is in the low data content image mode when the switchable lens/diffuser is in the diffusing mode and the image generation apparatus is in the high data content image mode when the switchable lens/diffuser is in the clear mode.

\* \* \* \* \*